United States Patent
Atmur (10) Patent No.: US 9,124,150 B2
(45) Date of Patent: Sep. 1, 2015

(54) ACTIVE-ACTIVE REDUNDANT MOTOR GEAR SYSTEM

(71) Applicant: The Boeing Company, Chicago, IL (US)

(72) Inventor: Robert Atmur, Whittier, CA (US)

(73) Assignee: The Boeing Company, Chicago, IL (US)

(*) Notice: Subject to any disclaimer, the term of this patent is extended or adjusted under 35 U.S.C. 154(b) by 224 days.

(21) Appl. No.: 13/941,401

(22) Filed: Jul. 12, 2013

(65) Prior Publication Data

US 2015/0015174 A1    Jan. 15, 2015

(51) Int. Cl.
| | |
|---|---|
| G05B 9/03 | (2006.01) |
| H02K 7/116 | (2006.01) |
| H02K 41/06 | (2006.01) |
| G05D 3/12 | (2006.01) |
| H02K 7/00 | (2006.01) |
| H02K 21/24 | (2006.01) |
| H02K 29/12 | (2006.01) |
| H02K 1/14 | (2006.01) |
| H02K 1/17 | (2006.01) |

(52) U.S. Cl.
CPC ............ *H02K 7/1163* (2013.01); *G05D 3/12* (2013.01); *H02K 7/003* (2013.01); *H02K 21/24* (2013.01); *H02K 29/12* (2013.01); *H02K 41/065* (2013.01); *H02K 1/14* (2013.01); *H02K 1/17* (2013.01); *H02K 2213/06* (2013.01)

(58) Field of Classification Search
CPC ............ G05B 9/03; G05D 9/13; H02K 1/14; H02K 2213/06
USPC ........... 318/564, 432, 434; 361/93.1, 1, 5, 31, 361/156.32; 310/323.16, 348
See application file for complete search history.

(56) References Cited

U.S. PATENT DOCUMENTS

| | | | | |
|---|---|---|---|---|
| 5,128,580 | A * | 7/1992 | Maeno et al. | 310/323.07 |
| 5,163,640 | A * | 11/1992 | Altobelli | 244/164 |
| 6,949,908 | B2 * | 9/2005 | Maslov et al. | 318/727 |
| 7,051,608 | B2 * | 5/2006 | Guerrero | 74/5.4 |
| 8,314,576 | B2 * | 11/2012 | Fahimi et al. | 318/400.21 |
| 8,339,142 | B2 * | 12/2012 | Oowada | 324/537 |
| 8,575,885 | B2 * | 11/2013 | Okumatsu | 318/801 |

* cited by examiner

Primary Examiner — Rita Leykin
(74) Attorney, Agent, or Firm — Felix L. Fischer (57) ABSTRACT

A fault tolerant virtual elliptical electric motor has at least four coil elements constrained in a stator case. A drive plate is supported by a fulcrum for nutating motion and has at least four core segments each associated with a respective one of the at least four coil elements for attraction upon activation. A control processor provides independent current control to each of the at least four coil elements for activation responsive to a received position command and a received wobble angle input, inducing the at least four coil elements to operate in a pure torque sum configuration upon the drive plate.

20 Claims, 9 Drawing Sheets

FIG. 8

ACTIVE-ACTIVE REDUNDANT MOTOR GEAR SYSTEM

REFERENCE TO RELATED APPLICATIONS

This application is copending with application Ser. No. 13/849501 filed on Mar. 23, 2013 entitled VIRTUAL ELLIPSE MOTOR having a common assignee with the present application, the disclosure of which is incorporated herein by reference.

BACKGROUND INFORMATION

1. Field

Embodiments of the disclosure relate generally to electric motors and more particularly to a three phase virtual elliptical motor with multiple coils for redundant operation allowing one or more coil or controller failures without preventing motor operation.

2. Background

Electromechanical actuators for primary flight control surfaces in large commercial aircraft require complex mechanical couplings in order to provide redundancy. These couplings are heavy and introduce additional failure modes and complex critical assembly tolerance constraints. Typically systems use speed summing of two independent motors. This requires that each motor has a brake and is connected to a differential which allows one motor to drive the load and, under a failure condition, to have its brake applied to allow the other motor to operate. This is a complex mechanical system that includes multiple gear meshes and bearing supports. This precision machine may have lower efficiency reducing the system performance. The brake is additionally a potential failure point and reduces the reliability of the system.

It is therefore desirable to provide an electric motor controlled actuator which does not require motor redundancy, speed summing or brake systems to operate in a failure tolerant mode.

SUMMARY

The embodiments described herein provide a fault tolerant virtual elliptical electric motor having at least four coil elements constrained in a stator case. A drive plate is supported by a fulcrum for nutating motion and has at least four core segments each associated with a respective one of the at least four coil elements for attraction upon activation. A control processor provides independent current control to each of the at least four coil elements for activation responsive to a received position command and a received wobble angle input inducing the at least four coil elements to operate in a pure torque sum configuration upon the drive plate.

The embodiments may be employed for an actuator for an aircraft surface by providing a rotation flange attached to the drive plate, the rotation flange adapted for connection to an actuating element associated with the aerodynamic surface.

A method for control of an actuator employing the disclosed embodiments is accomplished by receiving a position command. A nutational drive plate wobble angle is determined and current to at least three of a plurality of at least four stationary coil elements is sequentially controlled inducing nutation of the drive plate to achieve a wobble angle consistent with the received position command.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide an actuator employing a virtual elliptical electric motor with more than three coil segments acting independently but all operating on the same output plate in a pure torque sum instead of a speed summing operation. If any coil fails, or the controller for a coil fails disabling a coil, the sum of the torque is reduced but increased torque command to remaining coils accommodates the absence of torque from the failed coil. A failed coil or its controller has no impact to the motor operation due to a pure torque sum operation of the coils and no transition time is required to bring the system on-line after a fault occurs.

Figure 1:
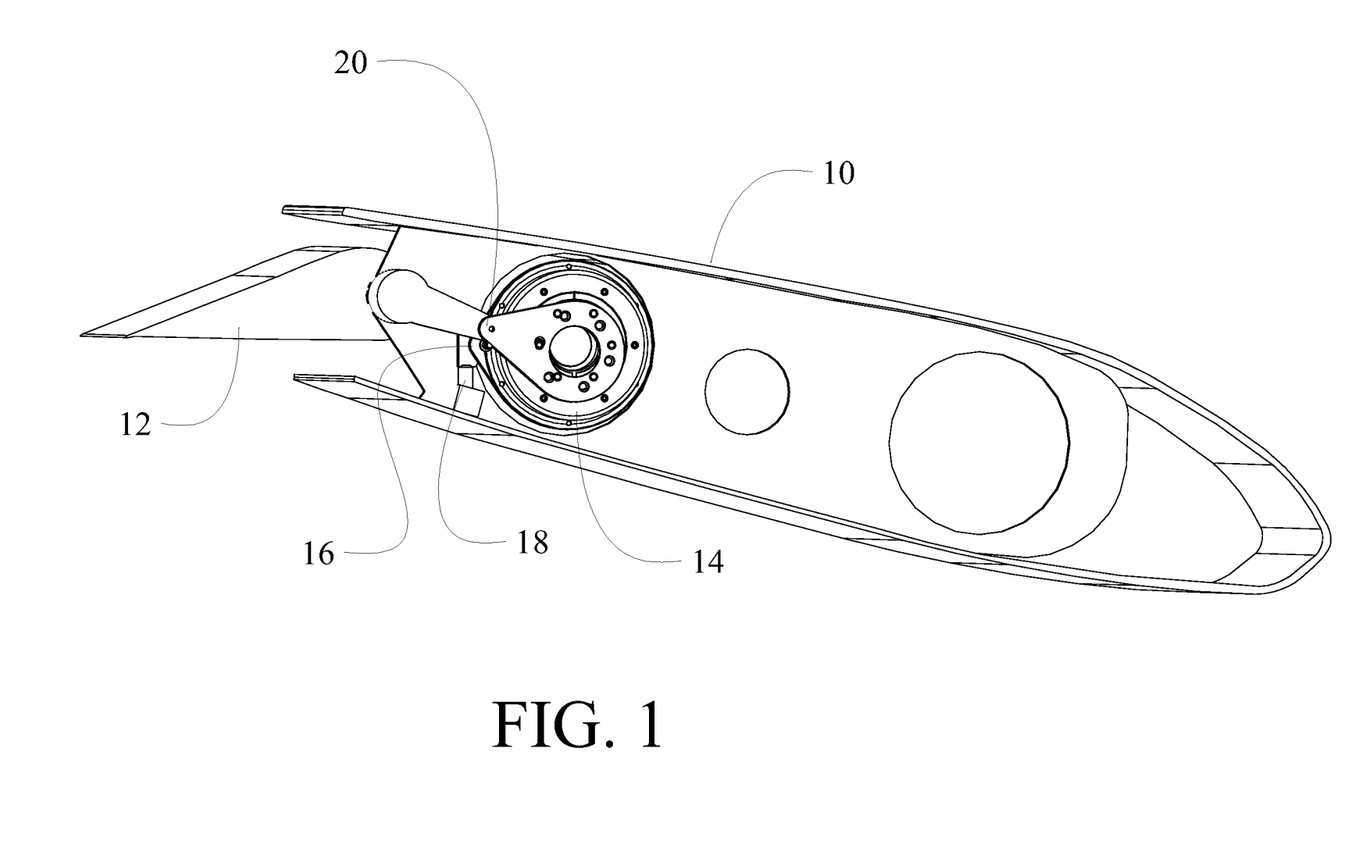
FIG. 1 is an isometric cut away view of an exemplary aerodynamic surface actuator according to the present embodiments incorporated in a wing

Referring to the drawings, FIG. 1 shows an aircraft wing 10 having an aerodynamic surface 12 such as an aileron, spoiler or flap providing an aircraft control surface system. An actuator 14 according to the present embodiments has a stationary connection 16 to a stationary structure such as wing structural element 18 for reaction of the actuation forces. A drive connection 20 is attached to actuating elements of the aerodynamic surface 12.

Figure 2:
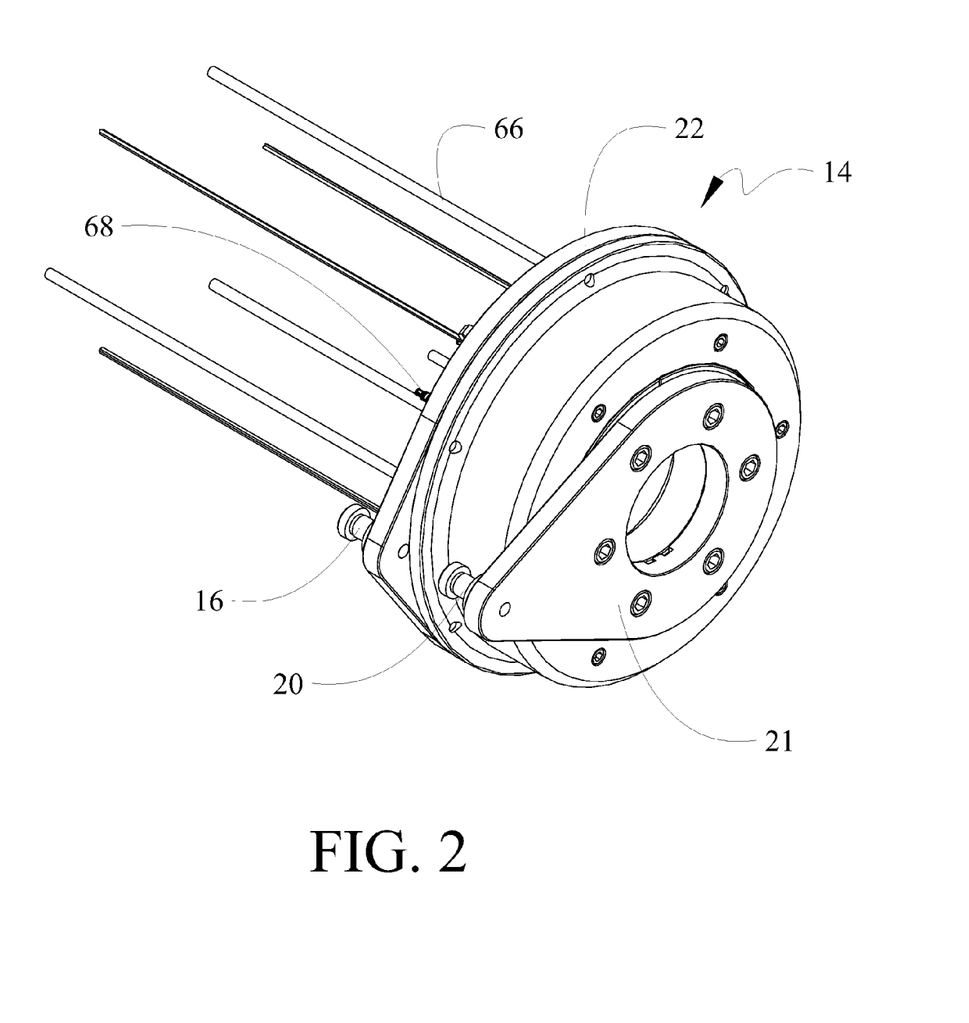
FIG. 2 is a detailed view of the actuator embodiment.

The actuator 14 is shown in detail in FIG. 2. Stationary connection 16 extends directly from a case 22 for the actuator. Drive connection 20 extends from a rotational flange 21. For the embodiments shown, stationary connection 16 and drive connection 20 are shown as cylindrical end elements to be received in monoball bearings in actuating rods. In alternative embodiments, other connection arrangements such as rod ends or flanges directly connected to the rotational flange 21 or a rotational output plate, to be described in greater detail subsequently, and actuator case 22 may be employed.

Figure 3:
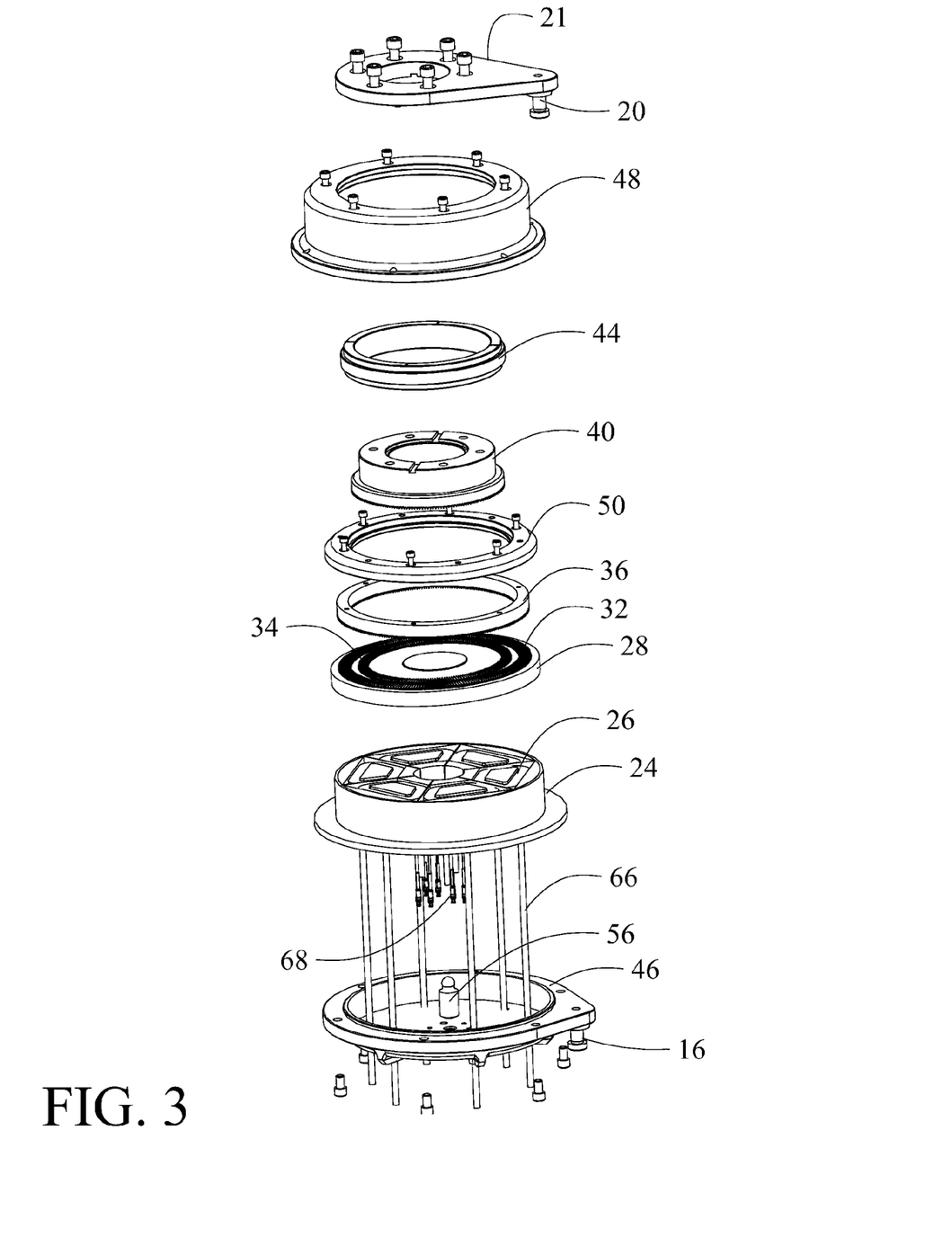
FIG. 3 is an exploded view of the actuator in a first perspective demonstrating the elements of the virtual elliptical electric motor.
Figure 4:
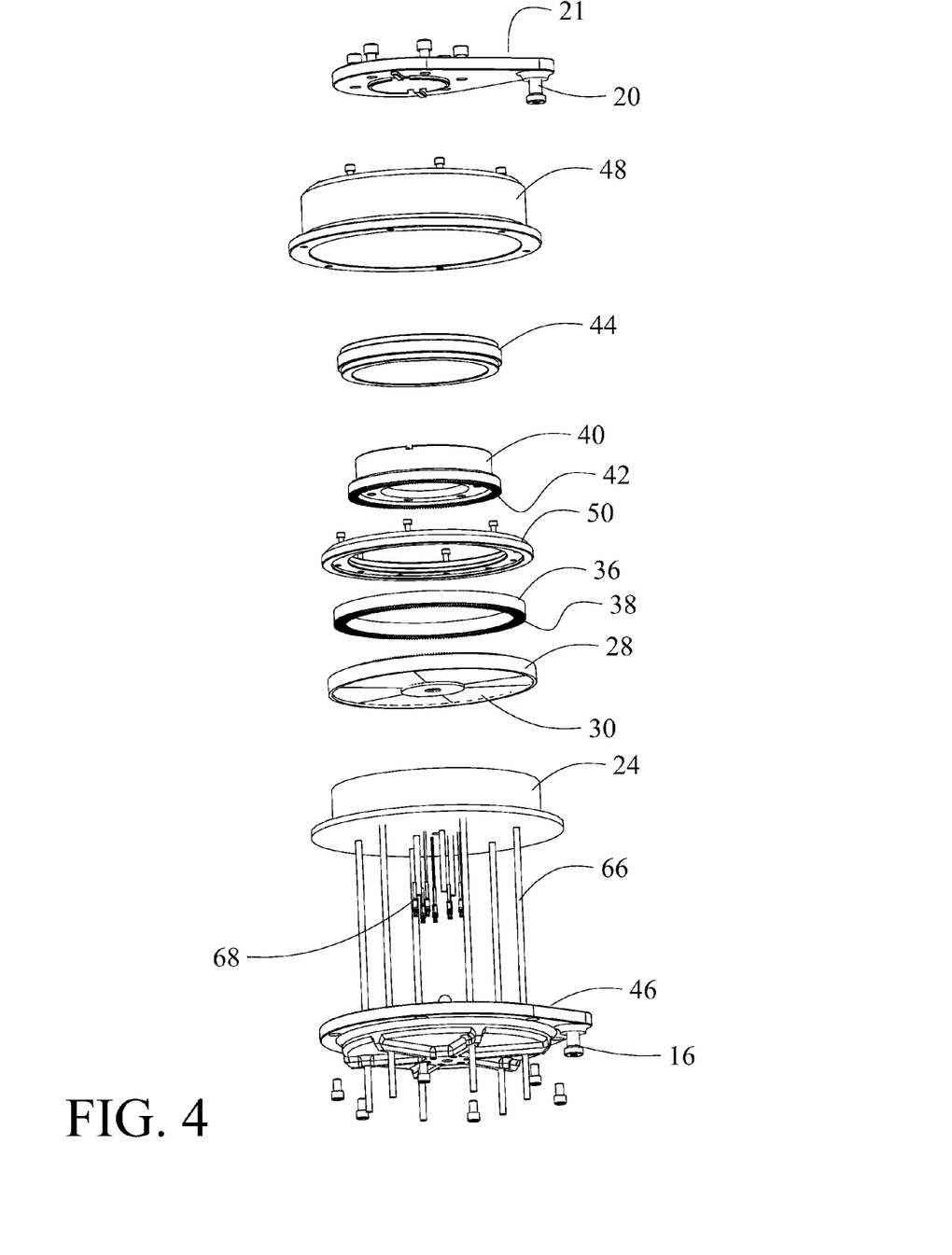
FIG. 4 is an exploded view of the actuator in a second perspective.

As shown in the exploded views of FIGS. 3 and 4, the actuator incorporates a virtual elliptical electric motor having a stator case 24 supporting multiple stator coil elements 26 (seen in FIG. 3 and described subsequently with respect to FIG. 5 in greater detail). For the embodiment shown, six stator coil elements 26 are shown however any number greater than four may be employed in alternative embodiments. A drive plate 28 incorporating matching core segments 30 (seen in FIG. 4) for the stator coil elements 26. The core elements 30 divide the drive plate 28 into sectors, each sector associated with a coil element 26. The drive plate 28 additionally has a outer pericyclic gear ring 32 proximate the outer circumference and an inner pericyclic gear ring 34 radially inward from the outer gear ring. A stationary or reaction gear plate 36 incorporates reaction pericyclic gear ring 38 (seen in FIG. 4) to matingly engage the outer pericyclic gear ring 32 on the drive plate 28. A rotational output plate 40 incorporates a rotational drive pericyclic gear ring 42 (seen in FIG. 4) to engage the inner pericyclic gear ring 34 on the drive plate 28. A bushing 44 supports the rotational output plate 40. The virtual elliptical electric motor is supported in the actuator case 22 which has a base 46 in which the stator case 24 is received. A cover 48 attaches to the base 46 with bolts 47 and supports the bushing 44. A reaction ring 50 engages the reaction gear plate 36 to the cover 48 with bolts 49 and 51 respectively. Rotational flange 21 attaches to the rotational output plate 40 with bolts 41.

Figure 5:
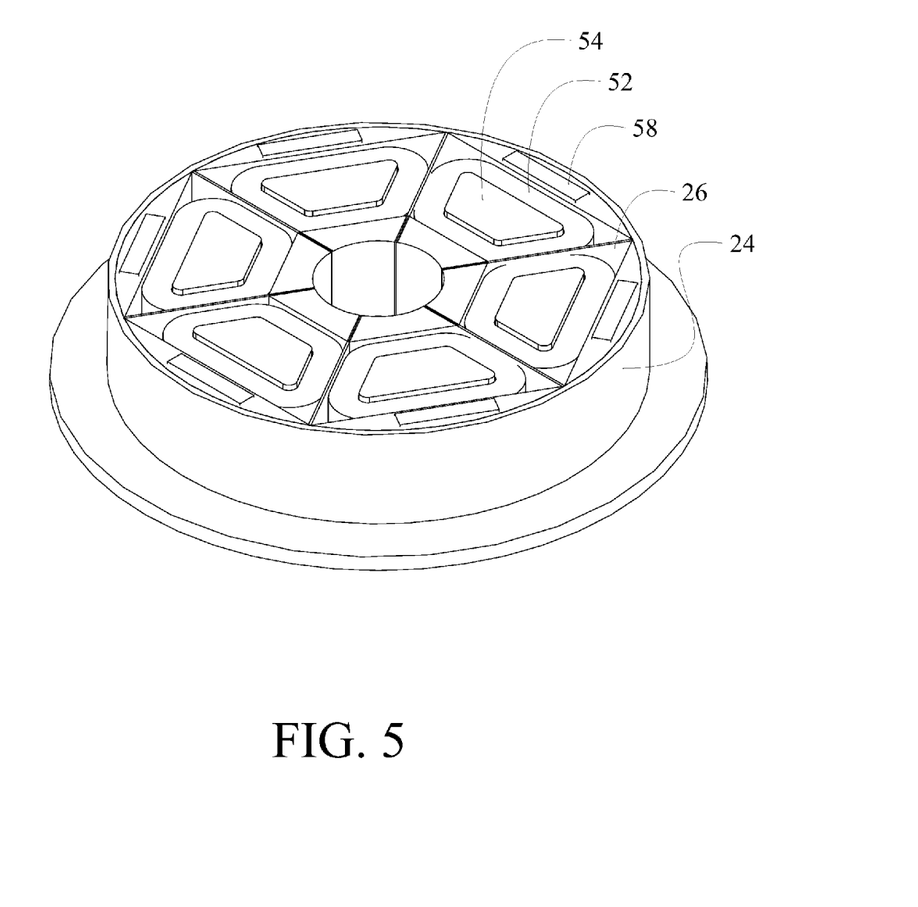
FIG. 5 is an isometric view of the coil system in the example embodiment
Figure 6A:
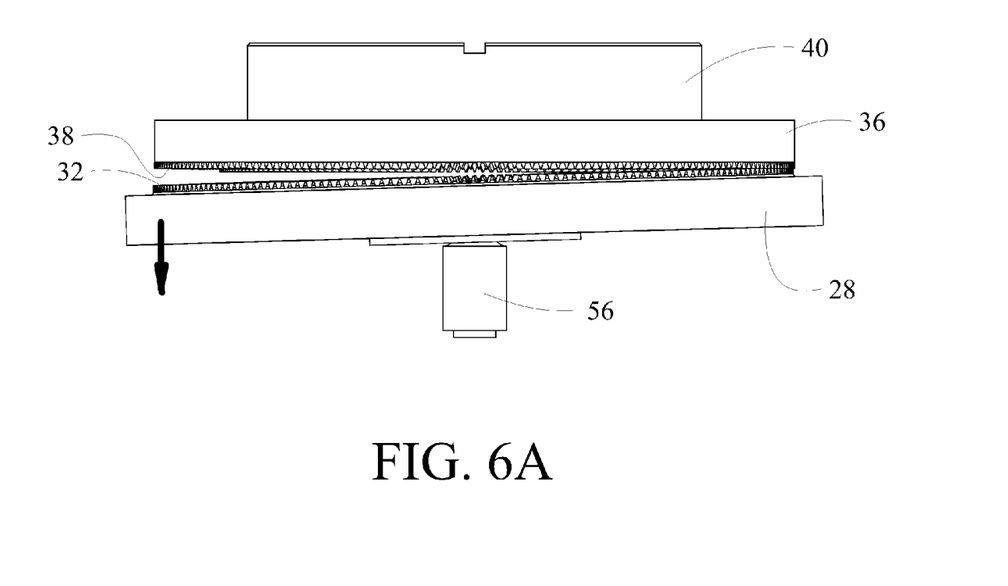
FIG. 6A is a side view of the engagement of the rotor gears and output plate and reaction plate drive gears.
Figure 6B:
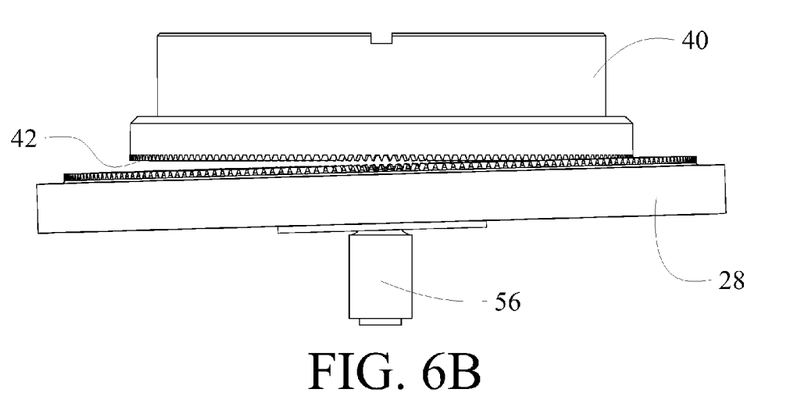
FIG. 6B is a side view of the engagement of the rotor gears and output plate with the reaction plate removed for clarity.

Details of the stator case 24 and stator coil elements 26 are shown in FIG. 5. Unlike conventional electric motors, the actuating coil 52 of each stator coil element 26 are located on stationary cores 54. Upon activation of the coil 52 by introduction of current, core 54 attracts corresponding matching core segment 30 on the drive plate 28. The drive plate 28 is supported by a fulcrum 56, seen in FIGS. 6A and 6B, as a wobble plate and nutates on the fulcrum with sequential activation of the coils 52. During operation, a first matching core segment 30 (seen in FIG. 4) in the drive plate 28 is electromagnetically pulled to the associated stator coil element 26 (seen in FIGS. 3 and 5) as indicated by arrow 57, and the diametrically opposite portion of the drive plate 28 is pushed against the reaction gear plate 36 and the rotational output plate 40 with engagement of the associated portions of the outer and inner pericyclic gear rings 32 and 34 (seen in FIG. 3) by the reaction pericyclic gear ring 38 and the drive pericyclic gear ring 42 (seen in FIG. 4), respectively. Sequentially activating the coils 52 causes the drive plate 28 to nutate on the fulcrum 56. The nature of pericyclic gears provides relative motion in the rising gears radially inward while descending gears move radially outward. Sequentially engaging and driving the inner pericyclic gear 34 of the drive plate 28 against the rotational pericyclic gear 42 on the rotational output plate 40 drives the rotational output plate 40 to rotate as the drive plate 28 nutates about the fulcrum 56. Reaction of the rotational motion to the actuator case 22 (formed by base 46 and cover 48) is provided by the outer pericyclic gear 32 of the drive plate engaging the reaction pericyclic gear 38 on the reaction ring 36. In an exemplary embodiment with 180 teeth on the outer and reaction pericyclic gears and 179 teeth on the inner and drive pericyclic gears, a gear ratio of 180 to 1 is achieved allowing very precise control with high mechanical advantage for the produced torque.

Figure 7:
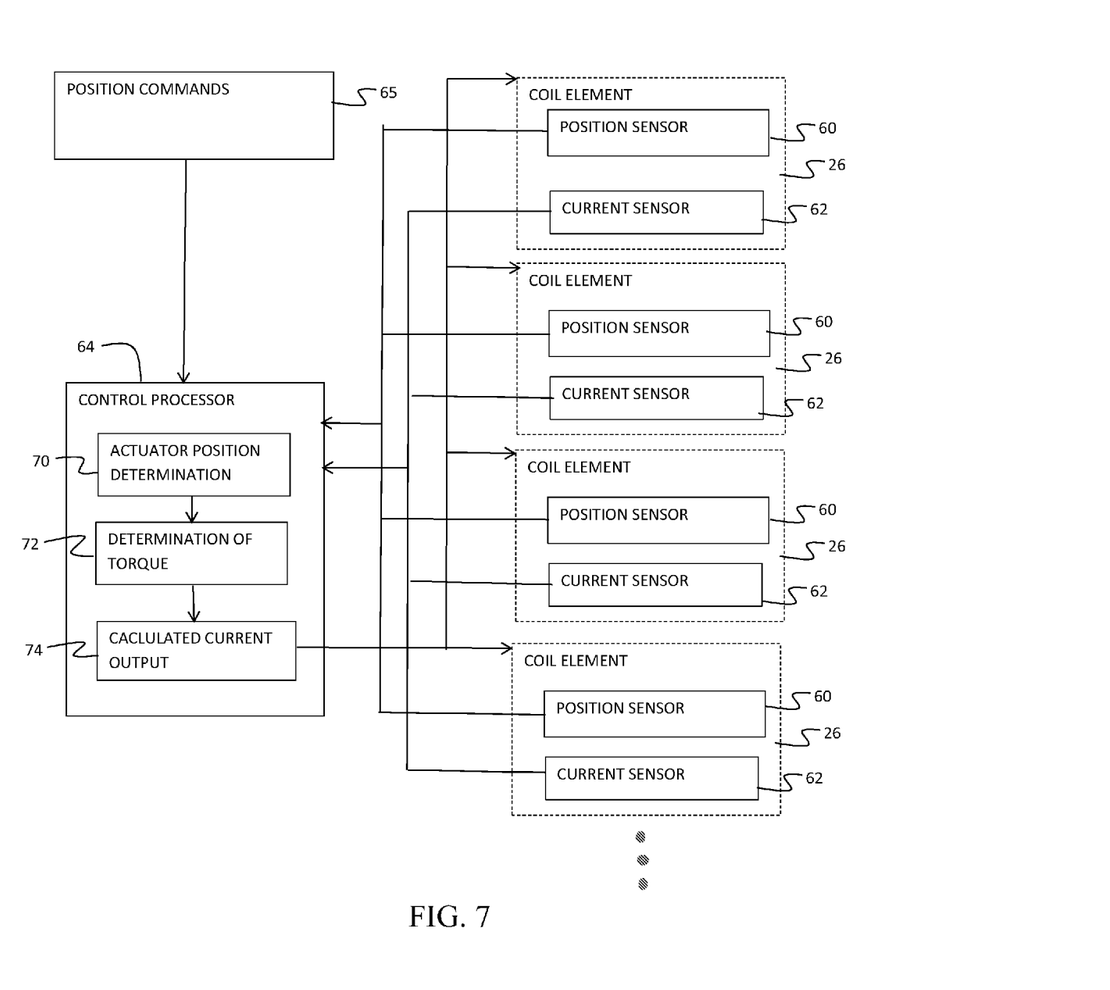
FIG. 7 is a block diagram of the actuator control elements.

Control of the virtual elliptical electric motor is accomplished by measuring the wobble angle of the drive plate 28 employing one or more position sensors and activating coil elements 26 responsive to a commanded torque. Each coil element is commanded independently of all other coils. As shown in FIG. 7, a position sensor 60 and a current sensor 62 are associated with each coil element (for the embodiment shown in the drawings six position sensors and 6 current sensors). In alternative embodiments a minimum of two position sensors, for example eddy current probes available from MICRO-EPSILON MESSTECHNIK GmbH & Co. KG, Ortenburg, Germany, spaced at 90° or 120° may be employed to provide a fully determinant calculation of the wobble angle. A control processor 64 receives position commands 65 for the actuator 14 from a flight control computer or similar command device and input from the position sensors 60 and current sensors 62. Control processor 64 incorporates programmed software modules to determine current actuator position based on wobble angle 70, and determine a torque command 72 required to rotate the drive plate 28 from the current position to a desired position based on the received position commands. A calculated current output 74 is sequentially applied through cables 66 (seen in FIGS. 3 and 4) to each coil element for activation resulting in nutation of the drive plate 28 to the desired position. Through feedback from the position sensors provided through attachment cables 68 (seen in FIGS. 3 and 4), current in the activated coil element is controlled by the control processor 64 to achieve the desired position change with respect to that coil element and position as determined by the position sensors without reference to other coil elements. Consequently, failure of a coil element or the controller for that element does not impede operation of the motor since additional current is applied to adjacent coil elements for desired position change. The coil elements operate in a pure torque sum to provide the nutation of drive plate 28.

Figure 8:
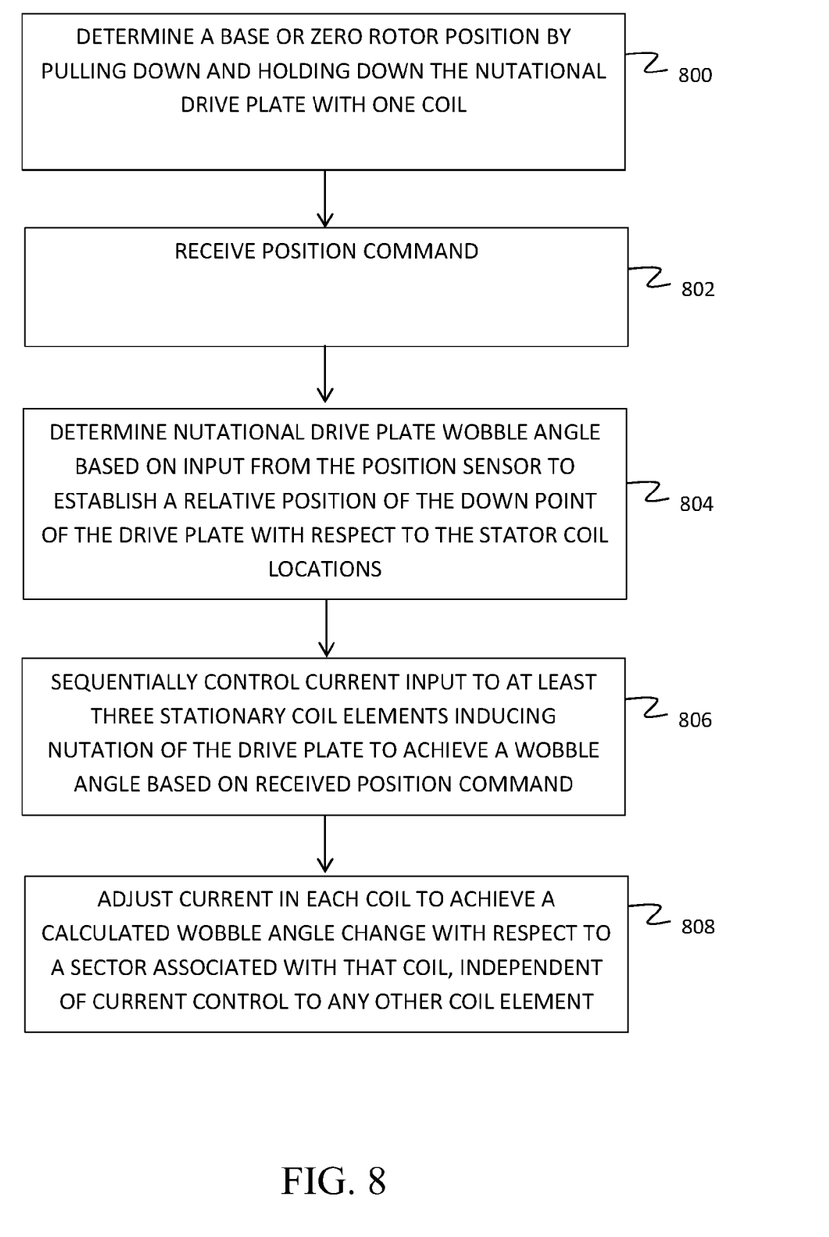
FIG. 8 is a flow chart for a method for employing embodiments of system as disclosed herein for control of the actuator including failure conditions.

Operation of the control processor is depicted in the flow chart of FIG. 8. A method for control of the virtual elliptical electric motor actuator commences with determining a base or zero rotor position by pulling down and holding down the nutational drive plate, step 800. The drive plate must be in a known and valid position in order for the stator to apply forces to the drive plate in a known and regular way. At least one coil is energized to pull the drive plate until the drive plate is at the maximum tilt angle with respect to that coil (full down). Measurement of position by the position sensors then establishes a zero position. A position command is then received, step 802. A nutational drive plate wobble angle is determined by the control processor based on input from the position sensor to establish a relative position of the down point of the drive plate with respect to the stator coil locations, step 804. Current input is then sequentially controlled by the control processor for application of current to at least three of a plurality of at least five stationary coil elements inducing nutation of the drive plate to achieve a wobble angle consistent with the received position command, step 806. Application of current to the coils is determined as a force vector application. Using the position measurements, a combination of current magnitudes are applied to all the stator coils. The forces generated by these currents, through magnetic attraction, sum as vectors on the rotor to create the desired hold down and torque. These vectors are independent of each other and can only apply force at their stator location. There is only a need for three vectors spaced at greater than 90 degrees apart to provide full control of the rotor. These currents are modulated as the rotor moves through its cycle. Current may be sequentially applied to all of the coil elements if they are operational. Current is adjusted in each coil to achieve a calculated wobble angle change with respect to a sector associated with that coil, independent of current control to any other coil element (current adjustment independent of current control) step 808. In any configurations of coils of five or greater, any single coil failure and any dual failure of non-adjacent coils results in at least three remaining coils spaced from one another by less than 160°. For larger numbers of coils, multiple coil failures may be accommodated as long as at least three coils remain with angles between the remaining coils of less than 160° between any two of the three coils.

In one exemplary embodiment six coils and rotor core segments provide two independent sets of three coils (three coil elements) each spaced 120 degrees apart around the stator with each of the coils of the first set intermediate two of the coils of the second set. Using the position measurements a combination of current magnitudes are applied to each set of stator coils. The forces generated by these currents, through magnetic attraction, sum as vectors on the rotor to create the desired hold down and torque. These currents are modulated as the rotor moves through its cycle. Because all forces are independent the two sets of three phases currents scale to the torque command modified by the relative rotor position. The magnitude of vector sum of the currents is controlled by the motor controller in response to some error (i.e. position, speed, acceleration). If all coils and/or controllers are active the individual coils will have an average current over the entire cycle or wobble of the rotor. When one or more coils are lost that set of three coils that lost the coil is de-energized, the vector sum needed to produce the desired force must remain the same so the average current in the remaining coils are simply increased by a factor of 1.7 to compensate for the loss. No other change is required.

To further accommodate failures of coil elements, permanent magnets 58 may be associated with each coil element 26 as shown in FIG. 5 to provide additional hold down force for the core segments 30 of the drive plate 28. The nutating drive plate 28 will place each core segment proximate the associated permanent magnet sequentially and the magnet will provide attractive force for the core segment 30 in the drive plate 28, even if the associated coil 52 is not energized for magnetization of stationary core 54, thereby counteracting any tendency of the gear reaction to lift the drive plate 28 over the inactive coil. This enhances the capability of the drive plate to wobble through the sector of the failed coil. In the embodiment shown, the permanent magnets 58 are located proximate the peripheral circumference of the stator case 24 for close contact with the nutating periphery of the drive plate 28.

By providing at least five coil elements with associated coils and stationary cores to attract associated core segments in the drive plate, failure of one coil element with not affect operation of the virtual elliptical electric motor. Oversizing of the current capacity by 70% in a six coil system operating in two sets of three as previously described allows coil sets to receive sufficient current to overdrive the nutation of the drive plate through the sector associated with the inoperative coil element. Each additional coil element incorporated in the system will provide capability to tolerate an additional non-adjacent failed coil in the motor. The exemplary six coil element configuration of the embodiment as described herein when operating with all six coils independently controlled will accommodate failure of three non-adjacent coils or two adjacent coils without impact to operation of the motor.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A fault tolerant virtual elliptical electric motor comprising:
   at least five coil elements constrained in a stator case;
   a drive plate supported by a fulcrum for nutating motion and having at least five core segments each associated with a respective one of the at least five coil elements for attraction upon activation; and,
   a control processor providing independent current control to each of the at least five coil elements for activation responsive to a received position command and a received wobble angle input, said at least five coil elements operating in a pure torque sum configuration upon the drive plate.

2. The fault tolerant virtual elliptical electric motor as defined in claim 1 wherein each coil element comprises:
   a stationary core; and,
   a coil operatively associated with the stationary core for magnetization of the core upon introduction of current in the coil.

3. The fault tolerant virtual elliptical electric motor as defined in claim 1 wherein the drive plate incorporates an outer pericyclic gear and an inner pericyclic gear and further comprising:
   a reaction plate having a reaction pericyclic gear adapted for mating engagement of the outer pericyclic gear; and,
   a drive plate have a drive pericyclic gear adapted for mating engagement of the inner pericyclic gear.

4. The fault tolerant virtual elliptical electric motor as defined in claim 3 further comprising:
   a case connected to the reaction plate and having a stationary connection for attachment to a structure; and,
   a rotation flange attached to the drive plate, said rotation flange adapted for connection to an actuating element.

5. The fault tolerant virtual elliptical electric motor as defined in claim 4 further comprising a bushing adapted to rotatably support the drive plate in the case.

6. The fault tolerant virtual elliptical electric motor as defined in claim 1 further comprising at least two position sensors providing the wobble angle input to the control processor.

7. The fault tolerant virtual elliptical electric motor as defined in claim 6 wherein the at least two position sensor comprises six position sensors.

8. The fault tolerant virtual elliptical electric motor as defined in claim 1 wherein the at least five coil elements comprise six coil elements and the at least five core segments comprise six core segments.

9. The fault tolerant virtual elliptical electric motor as defined in claim 1 further comprising a permanent magnet associated with each of the at least five coil elements.

10. The fault tolerant virtual elliptical electric motor as defined in claim 1 wherein said control processor includes programmed software modules to determine current actuator position based on wobble angle, and determine a torque command required to rotate the drive plate from a current position to a desired position based on the received position command.

11. An aircraft control surface system comprising:
   an aerodynamic surface;
   a fault tolerant virtual elliptical electric motor having
      at least five coil elements constrained in a stator case;
      a drive plate supported by a fulcrum for nutating motion and having at least five core segments each associated with a respective one of the at least five coil elements for attraction upon activation;
      a rotation flange attached to the drive plate, said rotation flange adapted for connection to an actuating element associated with the aerodynamic surface; and,
      a control processor providing independent current control to each of the at least five coil elements for activation responsive to a received position command and a received wobble angle input, said at least five coil elements operating in a pure torque sum configuration upon the drive plate.

12. The aircraft control surface system as defined in claim 11 wherein the drive plate incorporates an outer pericyclic gear and an inner pericyclic gear and further comprising:
   a reaction plate having a reaction pericyclic gear adapted for mating engagement of the outer pericyclic gear;
   the drive plate having a drive pericyclic gear adapted for mating engagement of the inner pericyclic gear; and, a case enclosing the drive plate, coil elements and reaction plate, the case connected to the reaction plate and having a stationary connection for attachment to a structure.

13. The aircraft control surface system as defined in claim 11 further comprising a bushing adapted to rotatably support the drive plate in the case.

14. The fault tolerant virtual elliptical electric motor as defined in claim 11 further comprising at least two position sensors providing the wobble angle input to the control processor.

15. The fault tolerant virtual elliptical electric motor as defined in claim 14 wherein the at least two position sensors comprises six position sensors.

16. The fault tolerant virtual elliptical electric motor as defined in claim 11 wherein the at least five coil elements comprise six coil elements and the at least five core segments comprise six core segments.

17. The fault tolerant virtual elliptical electric motor as defined in claim 11 further comprising a permanent magnet associated with each of the at least five coil elements.

18. A method for controlling an actuator comprising:
  receiving a position command;
  determining a wobble angle of a nutational drive plate mounted on a fulcrum; and,
  sequentially controlling current to at least three of a plurality of at least five stationary coil elements to attract associated core segments in the drive plate inducing nutation of the drive plate to achieve a wobble angle consistent with the received position command.

19. The method for control of an actuator as defined in claim 18 wherein the step of sequentially controlling current includes adjusting current in each coil to achieve a calculated wobble angle change with respect to a sector associated with that coil, said current adjustment independent of current control to any other coil element.

20. The method for control of an actuator as defined in claim 18 wherein the plurality of at least five stationary coil elements comprises a first set of three coil elements spaced at 120° and a second set of three coil elements, each coil in the second set intermediate two coils in the first set, and further comprising:
  identifying a failed coil;
  removing control power to the first set of three coils containing the failed coil; and,
  increasing current to the second set of coils by a factor of 1.7.

* * * * *